June 10, 1958     J. M. FACKLER, JR     2,837,936
DIVIDED POWER DIFFERENTIAL

Filed Sept. 19, 1956     2 Sheets-Sheet 1

INVENTOR
JOHN M. FACKLER, JR.

BY *Leech & Radue*

ATTORNEYS

June 10, 1958     J. M. FACKLER, JR     2,837,936
DIVIDED POWER DIFFERENTIAL

Filed Sept. 19, 1956     2 Sheets-Sheet 2

INVENTOR
JOHN M. FACKLER, JR.

BY *Leech & Radue*

ATTORNEYS

United States Patent Office 2,837,936
Patented June 10, 1958

2,837,936

DIVIDED POWER DIFFERENTIAL

John M. Fackler, Jr., Embreeville, Pa.

Application September 19, 1956, Serial No. 610,749

8 Claims. (Cl. 74—711)

This invention relates to differential gearing and more particularly to a divided power differential having means for providing continuous power output to one side even though slippage or overrunning exists in the other side.

The conventional differential used in motor vehicles today is of the type wherein the differential is operative as long as the two outputs maintain traction and are running at approximately the same speed. When this condition changes and either one of the outputs loses traction the increased speed of the spinning wheel which normally follows such slippage causes the differential to be functionally inoperative. In other words, the spinning or overrunning of one output axle causes the driving energy to be dissipated in the differential and hence no power is available for the output side having traction.

The outstanding object of this invention is the provision of a differential having means for providing continuous power output from one side of the unit even though the other side has become ineffective due to slippage or overrunning.

Another object is the provision of a differential such as the above wherein a brake type locking action is used for assuring continuous power output to at least one side of the differential.

Yet another object is the provision of a differential described above which is effective in either forward or reverse direction.

A still further object is the provision of a differential as in the preceding objects which will be economical to manufacture, and trouble-free in operation.

Another object is to provide a differential which may be used in a transfer case to provide positive power to two or more differentials in two or more live axles as in the four or six wheel drive vehicles commonly used by the military.

These and other objects and advantages of the invention will appear more clearly in the following detailed description and drawings wherein.

Briefly, this differential comprises the conventional pinion and ring gear, a sun gear centrally secured to each face of the ring gear, a pair of planet gears diametrically positioned on and engaging each sun gear, a pair of generally semi-circular brake shoes positioned in spaced and confronting relation over the planet gears on each side of the ring gear, each brake shoe having internal teeth meshing with one of the planet gears, the effective radius of the internally toothed portion of the brake shoes varying from a maximum at its midpoint to a lesser radius at each extremity so that the travel of the planets between the suns and internal toothed portions of the brake shoes will cause the shoes to move outwardly as the planets move to the portions of lesser radius, a synchronizing plate connected to each pair of brake shoes, each synchronizing plate having a splined opening extending centrally therethrough, said opening being perpendicular to the flat surface of the plate, a synchronizing shaft having splines near each end fitting loosely into the splined openings in the synchronizing plates, a brake drum fitting over and surrounding each brake shoe pair, a splined hub extending from each drum, and a splined axle fitting in each splined hub.

With this differential in a vehicle which is running in a straight line the speed of both wheels, one being driven from each side of the differential, is the same and the brake shoes are pressed out against the brake drum by means of the planet gears which have moved away from the point of maximum radius of the toothed portion of the brake shoe. When one wheel overruns the other, the faster wheel causes the brake drum to which it is connected to also revolve faster than the central parts of the differential, dragging with it for a few degrees the brake shoes with which it is in contact until the free motion provided by the loose splining of the synchronizing plates is taken up thus causing the planets on its side of the ring gear to return near to the point of maximum radius of the toothed portion of the brake shoes and thus relieve the outward pressure of the brake shoes against the drum and allow that drum and output axle to run freely and completely disengaged from the remainder of the differential elements.

The specific details of construction and mode of operation will appear more clearly in the following detailed description.

Figure 1:
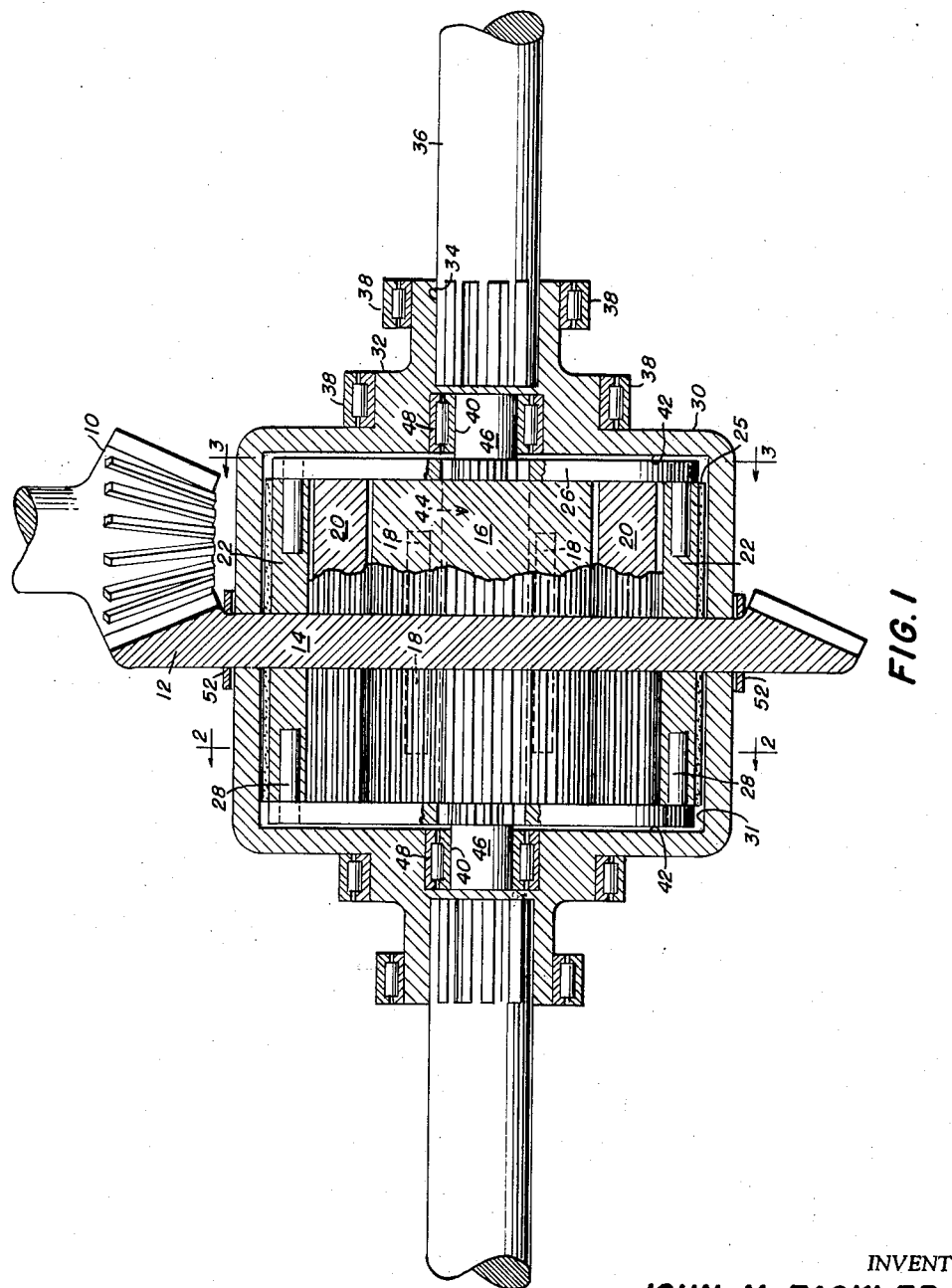
Fig. 1 is a sectional view of the assembled differential with the housing omitted, taken on the axis of the driven shafts.
Figure 2:
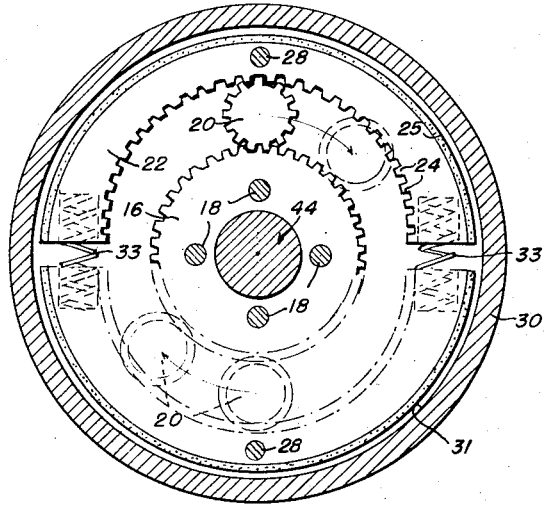
Fig. 2 is a vertical cross-sectional view taken along line 2—2 of Fig. 1.

As shown in Figs. 1 and 2, this differential includes the conventional pinion gear 10 which engages ring gear 12 having a plate portion 14 with a sun gear 16 secured to each side thereof by means of pins 18.

The elements carried on each side of the ring gear are identical in size, shape and function, consequently only one side will be described from this point.

A pair of planet gears 20—20 are positioned on the sun gear 16 in diametrically opposite relation. A pair of generally semi-circular brake shoes 22—22 are placed over the sun and planet gears in spaced and confronting relation. Each brake shoe has an internally toothed generally semi-circular portion 24 which is engaged by one of the planet gears 20. The toothed portion 24 has an effective radius varying from a maximum at its midpoint to a lesser radius at each extremity. These radii extend from the longitudinal axis of the synchronizing shaft 44. Every brake shoe also has a brake lining 25 on its periphery of a type which may be used in oil.

Figure 3:
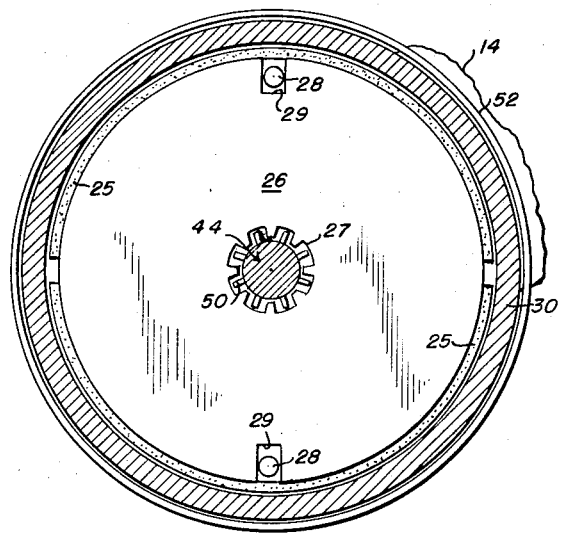
Fig. 3 is a vertical cross-sectional view taken along line 3—3 of Fig. 1.

As indicated in Figs. 1 and 3 a synchronizing plate 26 is connected to brake shoes 22 on each side of the ring gear by means of pins 28 secured therein, said pins operating in radial slots 29 of the synchronizing plate 26. The slots in the synchronizing plate make it possible for the brake shoes to move inwardly and outwardly with respect to the axis of the differential to engage or be released from the inner peripheral face of the brake drum.

The synchronizing plate 26 has a splined, centrally disposed opening extending therethrough which is perpendicular to the face of the plate. The assemblage of sun, planets, brake shoes and synchronizing plate has a brake drum 30 fitting over and surrounding it. The spacing between the brake lining and the inner peripheral face 31 of the brake drum, as subsequently defined, is just sufficient to prevent the development of too much drag between these parts. Actually, springs 33 which are interposed between the confronting ends of the brake shoe serve to maintain these shoes in very light frictional engagement with the inner face of the drum.

A hub 32 extends outwardly from the central portion of brake drum 30 and has a splined opening 34 which receives splined output axle 36.

The brake drum and hub are mounted in bearings 38 adapted for attachment to the differential housing which is not shown in the drawings. Each brake drum 30 has a cylindrical opening 40 centrally disposed in its inner face 42. A synchronizing shaft generally designated as 44 has end journal portions 46 which are suitably mounted in bearings 48 in brake drum openings 40.

As indicated in Figs. 1 and 3, the synchronizing shaft 44 extends freely through holes in sun gears 16 and ring gear plate 14. In addition this shaft has splined portions 50 which fit in splined holes 27 in synchronizing plates 26. Thus it will be seen that synchronizing shaft 44 is rotatably carried by bearings in the inner faces of the brake drums and that its splined portions engage splined holes in the synchronizing plates to operatively connect the synchronizing shaft with the synchronizing plates. The splining connections between the shaft and plate are such that there are a few degrees of rotational freedom therebetween. That portion of shaft 44 extending through the sun gears and the ring gear plate is of such diameter that it does not bear thereon.

The ring gear plate 14 has flange members 52 on both sides fitting closely around the outer face of the brake drum 30 as indicated in Fig. 1. This is a safety feature to prevent unbalance and tendency to twist which might be caused by uneven wear on the brake lining.

In operation, power is supplied to pinion gear 10 thus turning ring gear 12 and sun gears 16 attached to each side of the ring gear plate. Sun gears 16 engage and rotate planet gears 20 thus causing the planet gears to traverse a short distance along the respective toothed portions 24 of brake shoes 22 as indicated in dotted lines in Fig. 2. Since the effective radius of the toothed portions 24 decreases from the center, movement to either side, from the central position shown, by the planet gears forces the brake shoes outwardly against the inner peripheral faces of the brake drums. The planet gears will continue to traverse the toothed portions 24 until the brake shoes are solidly forced against the brake drums, at which time the planet gears will traverse no further being jammed between their respective sun gear and toothed portions 24.

This occurs on both sides of the ring gear and when this condition exists power is supplied to both output shafts 36 by way of pinion 10, ring gear 12, sun gears 16, planet gears 20, brake shoes 22, and brake drums 30. In other words, all of the above are in locked relation so that they operate as a unit.

Whenever one axle, for example, the right axle, due to slippage or overrunning turns faster than the left axle, then the right brake drum 30 will turn faster than the left drum and thereby carry right brake shoes 22 and their respective planet gears 20 with it until the few degrees of freedom between the splines on synchronizing plate hole 27 and those on synchronizing shaft 44 are taken up. At this point the right brake shoes and planet gears can no longer follow the right brake drum 30 since synchronizing shaft 44 is connected to the right and left synchronizing plates by now engaged splines and the left side of the mechanism is still in locked position thus not allowing shaft 44 to turn more than the few degrees of freedom allowed by the splined connections between the shaft and the synchronizing plates.

However, the turning which is allowed by the few degrees of freedom in the splining is sufficient to permit the right planet gears 20 to return to approximately the midpoints of toothed portions 24 of the right brake shoes 22 thus relieving the outward thrust of the brake shoes against the drum 30 thereby permitting the right drum and the axle secured thereto to run freely. In this condition there is no power output to the right axle, yet power is still furnished the left axle since the gears and brake shoes are still in the locked position on this side.

Since the more or less neutral point of each brake shoe toothed portion 24 is at its midpoint it is obvious that this differential is effective in either forward or reverse rotation of the output axle. Thus the principle of operation and the relation of all parts to each other are identical which greatly enhances the utility of this invention.

Although a differential housing is not shown it is of course intended that this differential should operate in oil within a suitable housing as do conventional units. The brake lining is of the type commonly used in automatic transmissions where the braking means are exposed or operating in oil.

While only one embodiment of this invention has been illustrated and described, it is obvious that this invention is capable of being used in many types of installations where a differential having at least one continuous power output is desired.

Having thus described my invention, what I claim as novel and desire to secure by Letters Patent of the United States is:

1. A differential wherein power will be furnished one output even though the other output is running free, said differential comprising a pinion gear, a ring gear engaging said pinion, sun gears secured to each side of the ring gear, a pair of nearly semi-circular brake shoes positioned around the sun gear on each side of the ring gear, a brake drum over each brake shoe pair, an output member connected to each brake drum, said brake shoes being mounted so that their ends confront each other, each brake shoe having an internal surface whose radius varies from a maximum at its center point to a lesser radius at each end, means operatively engaged with each sun gear and in contact with the internal surface of the brake shoe so that movement over this surface towards either end by the means will force the brake shoe outwardly into engagement with its drum, a synchronizing plate having a driven connection with each pair of brake shoes, and a synchronizing shaft providing a lost motion connection between said synchronizing plates.

2. The device as described in claim 1 wherein the internal surface on each brake is toothed, and also wherein the means comprises a planet gear in engagement with each toothed portion of a brake shoe and its sun gear.

3. The device described in claim 2 wherein the synchronizing plates each have a centrally positioned splined hole and the synchronizing shaft has splines which interfit with the splines in the synchronizing plates to form the lost motion connection between said plates.

4. A differential wherein power will be furnished one output when the other output is running free, said differential comprising a pinion gear, a ring gear meshing with said pinion gear, a sun gear centrally secured to each side of the ring gear, a pair of planet gears meshing with and diametrically positioned on each sun gear, a pair of generally semi-circular brake shoes positioned around the sun gear on each side of the ring gear, said brake shoes being mounted so that their extremities confront each other, each brake shoe having internal teeth meshing with a planet gear, the radius of the internally toothed portion of each brake shoe varying from a maximum at its midpoint to a lesser radius at each extremity so that the travel of each planet gear around its respective sun gear toward either end of the brake shoe will force the shoe outwardly, a spring between the confronting ends of each pair of brake shoes to maintain them in spaced relation, a synchronizing plate connected to each pair of brake shoes, a synchronizing shaft loosely connected to the synchronizing plates, a brake drum fitting over and surrounding each brake shoe pair, and an output axle extending from each brake drum.

5. The device as described in claim 4 wherein the synchronizing plates each have a centrally positioned splined hole and the synchronizing shaft has splines which loosely interfit with the splines in the synchronizing plates so that there are a few degrees of freedom between cooperating splines thus forming the lost motion between the synchronizing plates.

6. The device as described in claim 5 and including a flange member on each side of the ring gear, said flanges closely encircling the brake drums.

7. A differential wherein power will be furnished one output even though the other output is running free, said differential comprising a pinion gear, a ring gear engaging said pinion, actuating means operatively associated with each side of the ring gear, a pair of nearly semi-circular brake shoes positioned around the actuating means on each side of the ring gear, said brake shoes being mounted so that their ends confront each other, a brake drum over each brake shoe pair, an output member connected to each brake drum, said actuating means being in contact with each brake shoe pair so that rotation of the actuating means in either direction will force each brake shoe outwardly into engagement with its drum, a synchronizing plate connected with each pair of brake shoes, and a synchronizing shaft loosely connected to the synchronizing plates.

8. A differential wherein power will be furnished one output when the other output is running free, said differential comprising a pinion gear, a ring gear meshing with said pinion gear, a sun gear centrally secured to each side of the ring gear, a pair of planet gears meshing with and diametrically positioned on each sun gear, a pair of generally semi-circular brake shoes positioned around the sun gear on each side of the ring gear, said brake shoes being mounted so that their extremities confront each other, each brake shoe having internal teeth meshing with a planet gear, the distance between each sun gear and the internal teeth on the brake shoes varying from a maximum at the midpoints of the brake shoes to a lesser distance at either side thereof so that the travel of each planet gear around its respective sun gear toward either end of the brake shoe will force the shoe outwardly, a synchronizing plate connected to each pair of brake shoes, a synchronizing shaft loosely connected to the synchronizing plates, a brake drum fitting over and surrounding each brake shoe pair, and an output axle extending from each brake drum.

References Cited in the file of this patent
UNITED STATES PATENTS
1,491,837   Williamson _____ Apr. 29, 1924